United States Patent [19]
Mulders

[11] 3,920,570

[45] Nov. 18, 1975

[54] SEQUESTRATION OF METAL IONS BY THE USE OF POLY-ALPHA-HYDROXYACRYLATES

[75] Inventor: Julien Mulders, Brussels, Belgium

[73] Assignee: Solvay & Cie., Brussels, Belgium

[22] Filed: June 27, 1974

[21] Appl. No.: 483,541

Related U.S. Application Data

[62] Division of Ser. No. 207,965, Dec. 14, 1971, Pat. No. 3,839,215.

[30] Foreign Application Priority Data

Dec. 17, 1970 Luxemburg.............................. 62270

[52] U.S. Cl............................. 252/89; 252/DIG. 11
[51] Int. Cl.$^2$............................................. C11D 3/00
[58] Field of Search .......... 252/89, 181; 210/52, 58; 260/67 UA, 78.3

[56] References Cited
UNITED STATES PATENTS

| | | | |
|---|---|---|---|
| 2,728,746 | 12/1955 | Unruk................................ | 260/78.3 |
| 3,130,167 | 4/1964 | Green................................. | 252/181 |
| 3,507,795 | 4/1970 | Gardner.............................. | 252/181 |
| 3,516,910 | 6/1970 | Engman et al....................... | 210/52 |
| 3,524,811 | 8/1970 | Tsuk et al........................... | 252/181 |
| 3,686,145 | 8/1972 | Hasckke et al. .................. | 260/67 U |

*Primary Examiner*—William E. Schulz
*Attorney, Agent, or Firm*—Spencer & Kaye

[57] ABSTRACT

A process for sequestering metal ions by a polyelectrolyte, including presenting to the metal ions to be sequestered, as the sequestering polyelectrolyte, an alkali metal or ammonium salt of a poly-α-hydroxyacrylic acid of the formula

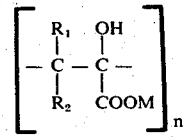

where $R_1$ and $R_2$ are selected from the group consisting of hydrogen and alkyl of between 1 and 3 carbon atoms, M is selected from the group consisting of alkali metal and ammonium, and n is a positive integer between 3 and a higher value such that substantial solubility is maintained.

10 Claims, No Drawings

SEQUESTRATION OF METAL IONS BY THE USE OF POLY-ALPHA-HYDROXYACRYLATES

CROSS REFERENCE TO RELATED APPLICATION

This application is a division of Application Ser. No. 207,965, filed Dec. 14th, 1971 and now U.S. Pat. 3,839,215.

BACKGROUND OF THE INVENTION

The present invention relates to a process for sequestering or inhibiting the precipitation of metal ions by alkali metal or ammonium salts of the poly-α-hydroxyacrylic acids, or the derivatives thereof.

Detergent compositions generally contain one or more active agents and, next to these, an auxiliary agent acting as reinforcer, often designated builder, which must present several properties the most important being a sequestering or chelating property. At the present time, the most used builders are sodium tripolyphosphate and, on a lesser scale, sodium nitrilotriacetate. The salts of hydroxycarboxylic acids such as sodium citrate, tartrate or gluconate are also possible builders, but their sequestering property, especially in regard to calcium and magnesium ions, is insufficient.

Salts of the oxydiacetic acid have also been proposed as builders for detergent compositions in the place of tripolyphosphate (Canadian Pat. No. 853,647 filed on Feb. 25th, 1969 by UNILEVER LIMITED). Another proposal (Dutch Pat. Application No. 70.00760 filed on Jan. 20th, 1970 by DEUTSCHE GOLD-UND SILBER-SCHEIDEANSTALT) concerns the use, as complex-forming agent, of hydroxycarboxyl polymers in which the —COOH/-OH ratio is at least 0.5 and preferably lies between 1.1 and 1.6. These polymers, whic can be prepared for instance by reaction of formaldehyde on a poly-aldehydocarboxylic acid in the presence of sodium hydroxide (CANNIZZARO reaction), have their —OH and —COOH groups separated by at least two carbon atoms, this giving a sequestering property distinctly lower than that of the tripolyphosphate. The following compounds have also been proposed as organic polyelectrolytes: ammonium polyacrylate (South-African Pat. No. 68/947 filed on April 21st, 1967 by W. R. GRACE AND Co., soluble salts of poly(itaconic acid) (U.S. Pat. No. 3,405,060 filed on June 16th, 1966 by MONSANTO Co. and British Pat. No. 1,054,755 filed on Mar. 26th, 1964 by PROCTER AND GAMBLE).

It is known, on the other hand, that many countries have to cope with the eutrophication of lake waters and running waters, i.e. the enrichment of these waters in nutrients for growth of algae and aquatic plants, which gives rise to various drawbacks resulting from the excessive growth of plant life. Among the drawbacks, one can cite the deterioration of the aesthetic aspect, the rise of difficulties during the water treatment, and the possible disappearance of aquatic fauna.

Since the main nutrients for growth of algae and aquatic plants contain phosphorus and/or nitrogen, most currently used builders, and more particularly sodium tripolyphosphate, have been criticized as promoting on a large scale the eutrophication of waters by increasing the phosphorus in domestic waste waters. The authorities of some regions are even setting about prohibiting the use of sodium tripolyphosphate in detergent compositions.

SUMMARY OF THE INVENTION

An object of the invention, therefore, is to provide a method for sequestering metal ions by agents free of phosphorus and nitrogen, the agents having such properties that they can advantageously replace sodium tripolyphosphate as a builder in detergent compositions.

This as well as other objects which will become apparent in the discussion that follows are achieved, according to the present invention, by a process for sequestering metal ions by a polyelectrolyte, including presenting to the metal ions to be sequestered, as the sequestering polyelectrolyte, an alkali metal or ammonium salt of a poly-α-hydroxyacrylic acid of the formula

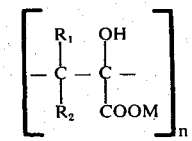

where $R_1$ and $R_2$ are selected from the group consisting of hydrogen and alkyl of between 1 and 3 carbon atoms, M is selected from the group consisting of alkali metal and ammonium, and n is a positive integer between 3 and a higher value such that substantial solubility is maintained.

DESCRIPTION OF THE PREFERRED EMBODIMENTS

The present invention relates to a process for sequestering metal cations from an aqueous solution by a polyelectrolyte, characterized in that the polyelectrolyte used as sequestering agent is an alkali metal or ammonium salt of a poly-α-hydroxyacrylic acid or one of its derivatives, corresponding to the formula

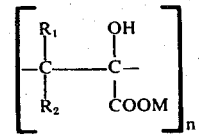

where $R_1$ and $R_2$ represent a hydrogen atom or an alkyl group having a number of carbon atoms lying between 1 and 3, M represents an atom of alkali metal or an ammonium group, and n is a whole number lying between 3 and a higher value determined by the limit compatible with the solubility of the compound in water.

$R_1$ and/or $R_2$ is advantageously equal to H or $CH_3$.

The molecular weight of the polyelectrolyte, determined by the FLORY relation from the combined results of ultracentrifugation and measuring of intrinsic viscosity (L. MANDERKERN and P. J. FLORY, J. Chem. Physics, 1952, 20, p. 212-214) lies advantageously between 20,000 and 140,000 (i.e., in the case of the sodium poly-α-hydroxyacrylate, an $n$ value, in the aforesaid formula, lying between 180 and 1275. The molecular weight will preferably not be lower than 26,000 ($n = 236$) because otherwise the sequestering power would decrease exaggeratedly.

Such polyelectrolytes are particularly suitable for sequestering the metal ions which cause water hardness (mainly calcium and magnesium ions); moreover, for this reason, they are advantageously used as builders in detergent composition. It is preferred to add them to water in quantities sufficient to sequester the calcium and magnesium ions in the water; i.e. in such quantity that no, or negligible, calcium and magnesium precipitates form in the system in which they are being used.

The compounds useful according to the present invention can be prepared following any method known per se. For example, the process described by C. S. MARVEL et al. (J. Am. Chem. Soc., 1940, 62, p. 3495-3498) and by L. M. MINSK and W. O. KENYON (J. Am. Chem. Soc., 1950, 72, p. 2650-2654) may be used: an α-haloacrylic acid is prepared and polymerized, thereafter the polymer of the haloacid is brought into reaction with water, the resulting product is dried, and put into reaction with a caustic alkali or ammonium hydroxide. A more detailed embodiment of the invention is given in the Example 1.

The salts of poly-α-hydroacrylic acids useful according to the present invention present very good sequestering properties, widely higher than those of the hydroxycarboxylates hitherto used as sequestering agents, such as sodium citrate, tartrate, and gluconate. These sequestering properties were confirmed for the metal ions in general, and for the ions which determine the water hardness in particular, i.e. mainly the calcium and magnesium ions. It will be understood that the required amount of sequestering agent depends on various factors, among others the type of metal ions and their concentration, the pH, the medium temperature, and the chemical composition of the polyelectrolyte used.

The sequestering property of the compounds according to the invention is also higher than that of other sequestering agents used as builders in detergent compositions, such as sodium tripolyphosphate and ammonium polyacrylate. It is at least comparable with that of sodium nitrilotriacetate, often used as builder in the place of sodium tripolyphosphate, but there is an advantage in the present invention in the fact that there is no nitrogen atom in the molecule of the acid radical. The poly-α-hydroxyacrylates can advantageously be employed as sequestering agents in any use of those products, among others for boiler water. They are particularly suitable as builders in detergent compositions, because they combine their very good sequestering properties with the absence of phosphorus and optionally of nitrogen; the elements most capable of promoting the pollution and/or the eutrophication of water are thus suppressed.

Further illustrative of the present invention are the following examples:

EXAMPLE 1

The sodium salt of a poly-α-hydroxyacrylic acid has been synthesized in the following manner:

a. 134 g of the technical methyl acrylate were placed in a three-necked flask fitted with a stirrer, a thermometer, an inlet tube and a gas trap. 60 cm³ of methanol were added and the flask was immersed in an ice-bath. Chlorine was passed into the ester rapidly over a period of five or six hours while the temperature was kept below 40°C. When it seemed that no more chlorine was being absorbed, the reaction was stopped. The methyl alcohol was removed by distillation in a closed system fitted with a gas trap. The flask was then fitted with a column and the contents were subjected to vacuum distillation (21 mm Hg pressure) at 72°-75°C. 201 g of methyl 2,3-dichloropropionate were obtained, this being an 85% yield.

b. 22 g of methyl 2,3-dichloropropionate obtained in a) were added dropwise to a mixture of 55 g of barium hydroxide octahydrate and 100 cm³ of water contained in a two-necked flask equipped with a stirrer and funnel. After stirring for two hours, the mixture was acidified with a solution of 12.5 g of concentrated sulfuric acid in 25 cm³ of water. The acidified mixture was extracted with five 40 cm³ portions of ether containing a total of 0.2 g of hydroquinone. The ether extract was dried over anhydrous magnesium sulfate and the ether was then evaporated under reduced pressure at room temperature. The solid residue was recrystallized from low-boiling petroleum ether to give 9.2 g (62%) of α-chloroacrylic acid having a melting point lying between 64° and 65°C.

c. A solution of 4.5 g of α-chloroacrylic acid obtained in b) in 30 cm³ of anhydrous alcohol-free ether was allowed to stand for three days under a mercury vapor lamp. A considerable amount of solid was separated from the solution during this period. The ether was poured off, the flask broken and the poly-α-chloroacrylic acid obtained chipped away from the glass. The yield was 100%.

d. The polymer obtained in c) was dissolved in 25 cm³ of water and heated to boiling. A gel was formed which filled the vessel in which the mixture was boiling. The gel, hardened to an easily pulverizable mass, had little coherence and became powdery on drying. This powder was dissolved in a solution of sodium hydroxide and the resulting solution was heated to boiling. Sodium poly-α-hydroxyacrylate corresponding to the formula

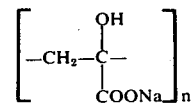

was obtained with a 100% yield; its FLORY molecular weight is 98,000 ($n = 890$).

The sequestering property of the sodium poly-α-hydroxyacrylic so obtained has been compared with that of sodium tripolyphosphate, sodium nitrilotriacetate, sodium citrate, sodium tartrate, sodium gluconate, an ammonium polyacrylate, and a polyhydroxycarboxylate prepared according to example 3 of the above-mentioned Dutch Pat. Application No. 70.00760.

The sequestering property has been measured in this way: 2 cm³ of an aqueous solution containing 10 g of the tested sequestering agent by litre were added to 38 cm³ of water having a hardness of 31° HF (French hydrotimetric degrees) (1° HF = hardness of water containing 10 mg of calcium carbonate per litre), and the hardness of the resulting solution was then measured; the following Table 1 gives the results obtained:

TABLE 1

| Sequestering agent | Hardness, French hydrotimetric degrees |
|---|---|
| Sodium nitrilotriacetate | 14 |
| Sodium poly-α-hydroxyacrylate | 14 |
| Sodium tripolyphosphate | 17 |
| Ammonium polyacrylate | 18 |
| Sodium citrate | 23 |
| Polyhydroxycarboxylate (Dutch | 28 |

TABLE 1-continued

| Sequestering agent | Hardness, French hydrotimetric degrees |
|---|---|
| Patent Application 70 00760) | |
| Sodium tartrate | 28 |
| Sodium gluconate | 29 |

EXAMPLE 2

This example is a comparison of the sequestering property in regard to calcium of some of the compounds considered in Example 1. Sodium tripolyphosphate was not used because it gives rise to a precipitate. In order to carry out this test, a 0.005 molar solution of calcium chloride is prepared, its pH being kept equal to 9.2 by adding 4 g of borax per litre. Increasing quantities of the sequestering agent were added to this solution, and the concentration in calcium ions was measured by using a specific electrode for calcium.

The following Table 2 reports the quantities, indicated in grams, of sequestering agent to be added to a litre of the solution of calcium chloride in order to sequester 97% of the calcium:

TABLE 2

| Sequestering agent | Quantity in grams |
|---|---|
| Sodium nitrilotriacetate | 1.40 |
| Sodium poly-$\alpha$-hydroxyacrylate | 1.40 |
| Sodium tripolyphosphate | — |
| Ammonium polyacrylate | 2.2 |
| Sodium citrate | 3.4 |
| Sodium tartrate | 4.0 |
| Sodium gluconate | >5 |

EXAMPLE 3

This example is a comparison of the sequestering property in regard to $Ca^{++}$ ions of various compounds considered in Example 1, except sodium tartrate and gluconate, as well as of sodium oxydiacetate. The measurements have been carried out in the following way: a 0.005 molar solution of calcium chloride was prepared, increasing quantities of the sequestering agent were added in the form of sodium salt, the pH was carried to 8 or 10 by addition of NaOH and the residual concentration in $Ca^{++}$ ion was measured with a specific electrode therefor.

The results obtained are set forth in the following Table 3.

Under consideration of the results reported in the Examples 1-3, the sequestering property of the poly-$\alpha$-hydroxyacrylates according to the invention is widely higher than that of the polyhydroxycarboxylates (Dutch Pat. Application No. 70.00760) and the other hydrocarboxylates (citrate, etc.).

In accordance with the conditions of use, it is comparable or higher than that of sodium tripolyphosphate and nitrilotriacetate.

On the other hand, Table 3 shows that the poly-$\alpha$-hydroxyacrylates present a lower sequestering property when the FLORY molecular weight is lowered from 98,000 to 26,000.

EXAMPLE 4

Test consisting in washing cotton samples soiled with various dirty marks have been carried out in order to compare the properties of the sodium poly-$\alpha$-hydroxyacrylates having a molecular weight of 98,000 according to the invention (designated $P_\alpha$) to those of sodium tripolyphosphate (TPP) in detergent compositions. The washing tests were carried out in a domestic washing machine. The water feeding the machine was very hard (35° HF). The cotton pieces were treated under the conditions usually used in Europe and consisting in a cold prewashing for 7 minutes, washing at a maximum temperature of 80°C (1 hour of heating and 14 minutes of keeping the temperature constant), rinsing for a period of 3 minutes with lukewarm water, rinsing four times (for 3 minutes each time) with intermediate spin-drying for 1 minute, and a final spin-drying for 4 minutes.

The load to be washed, with a total weight of 3.2 kg, was composed of cotton pieces of about 35 cm × 80 cm; cotton test pieces soiled artificially, of about 50 cm², were sewn on the load.

Twelve types of test pieces were used at a rate of ten test pieces per type. Six of them were prepared by the following specialized organizations:

Eidgenössischer Materialprüfung- und Versuchsanstalt, St. Gallen, Switzerland (2 test pieces: EMPA 101 and EMPA 115)

Test Fabrics Inc., New York, U.S.A.

U.S. Testing, U.S.A. (supplied by CENATRA, Belgium)

Waschereiforschung Krefeld, Germany, (WF KREFELD)

American Conditioning House Fiber Service, Inc., Boston (Mass.) U.S.A. (ACH 15).

TABLE 3

| pH | 8 | | | | 10 | | | |
|---|---|---|---|---|---|---|---|---|
| Concentration sequestering agent, g/l | 1.0 | 1.25 | 1.50 | 2.0 | 1.0 | 1.25 | 1.50 | 2.0 |
| | Residual concentration in $Ca^{++}$, mol/liter | | | | | | | |
| Poly-$\alpha$-hydroxyacrylate (mol. wt. 98,000) | 4 $10^{-4}$ | 3 $10^{-4}$ | 0.36 $10^{-4}$ | <0.1 $10^{-4}$ | 2 $10^{-4}$ | 1.2 $10^{-4}$ | 0.2 $10^{-4}$ | <0.1 $10^{-4}$ |
| Poly-$\alpha$-hydroxyacrylate (mol. wt. 26,000) | — | 5.5 $10^{-4}$ | 2.0 $10^{-4}$ | 0.1 $10^{-4}$ | — | 4.5 $10^{-4}$ | 1.6 $10^{-4}$ | <0.1 $10^{-4}$ |
| Oxydiacetate | 5.5 $10^{-4}$ | 3.4 $10^{-4}$ | 2.6 $10^{-4}$ | 1.8 $10^{-4}$ | 3.5 $10^{-4}$ | 2.4 $10^{-4}$ | 1.7 $10^{-4}$ | 1.1 $10^{-4}$ |
| Polyacrylate | 6.0 $10^{-4}$ | 4.0 $10^{-4}$ | 2.8 $10^{-4}$ | 1.4 $10^{-4}$ 4 | 4 $10^{-4}$ | 2.4 $10^{-4}$ | 1.2 $10^{-4}$ | 0.2 $10^{-4}$ |
| Nitrilotriacetate | 8.5 $10^{-4}$ | 5.0 $10^{-4}$ | 2.4 $10^{-4}$ | 0.8 $10^{-4}$ 7.5 | $10^{-4}$ 3.0 | $10^{-4}$ 0.3 | $10^{-4}$ <0.1 | $10^{-4}$ |
| Citrate | — | 9.0 $10^{-4}$ | 4.0 $10^{-4}$ | 1.8 $10^{-4}$ | — | 5.0 $10^{-4}$ | 3.0 $10^{-4}$ | 1.4 $10^{-4}$ |
| Polyhydroxycarboxylate (Dutch Patent Application 70.00760) | 11 $10^{-4}$ | 10 $10^{-4}$ | 9.5 $10^{-4}$ | 8.0 $10^{-4}$ | 10 $10^{-4}$ | 9.5 $10^{-4}$ | 8.5 $10^{-4}$ | 7.5 $10^{-4}$ |
| Tripolyphosphate | 3.0 $10^{-4}$ | 1.05 $10^{-4}$ | 0.9 $10^{-4}$ | 0.4 $10^{-4}$ | 2.0 $10^{-4}$ | 0.95 $10^{-4}$ | 0.5 $10^{-4}$ | 0.22 $10^{-4}$ |

These six types of fabrics were covered with grayish soil, generally pigmentary.

One type of test piece was covered with non-pigmentary grayish soil (blood, ink, etc.).

Five types of test pieces were covered with soil to be discolored (cocoa, wine, tea, bilberry black-currant).

Two types of white cotton were added to the load in order to evaluate the antiredeposition of the powder. These white cottons, prepared according to well defined rules, have been supplied by CENATRA (Belgium) and Test Fabrics, Inc. (U.S.A.).

Two washing powders, the composition of which is as follows, have been compared. They were used at the rate of 1 g per litre during the cold pre-washing and of 4 g per litre during the washing at 80°C (in other words a total of 100 g per cycle).

Compositions, for 100 g of powder, appear in Table 4.

TABLE 4

| Components | Quantity (g) | |
|---|---|---|
| | Powder 1 | Powder 2 |
| Sodium alkylarylsulfonate | 5 | 5 |
| Condensate of ethylene oxide and alkylphenol | 5 | 5 |
| Sodium palmitate | 5 | 5 |
| Carboxymethylcellulose | 1.25 | 1.25 |
| Tetrasodium ethylenediaminetetraacetate at 80 % | 0.25 | 0.25 |
| LEUCOPHOR BS (optical bleaching agent) | 0.40 | 0.40 |
| Sodium perborate tetrahydrate | 20 | 20 |
| $2MgO.3SiO_2.5.6\ H_2O$ | 1.39 | 1.39 |
| Sodium carbonate | 5 | 5 |
| $Na_2SiO_3.9H_2O$ | 23.56 | 23.56 |
| Sodium poly-α-hydroxyacrylate at 92 % | — | 32.61 |
| Technical sodium tripolyphosphate | 30 | — |
| Sodium sulfate | 3.15 | 0.54 |

The whiteness of each test piece (ELREPHO reflectance at 457 mμ) has been measured after 1, 2 and 3 washings. The results are set forth in the following Table 5. The mean increase in whiteness is given by $$\overline{A} = \frac{1}{n}\left(\sum_{i=1\ to\ n} A_i\right)$$

and the mean difference for each mean increase by $$\sigma_A = \sqrt{\frac{\Sigma\ (A_i - \overline{A})^2}{n - 1}}$$

The mean reflectance by:

$$\overline{R} = \frac{1}{n}\left(\sum_{i=1\ to\ n} R_i\right)$$

and the mean difference for each mean reflectance by $$\sigma_R = \sqrt{\frac{\Sigma\ (R_i - \overline{R})^2}{n - 1}}$$

with $n = 10$ and $i = 1$ to $10$.

TABLE 5

| | Test pieces | Powder | Agent Used | 0 $\overline{R}$ | $\sigma_R$ | 1 $\overline{R}$ | $\overline{A}$ | $\sigma_A$ | 2 $\overline{R}$ | $\overline{A}$ | $\sigma_A$ | 3 $\overline{R}$ | $\overline{A}$ | $\sigma_A$ |
|---|---|---|---|---|---|---|---|---|---|---|---|---|---|---|
| | ACH 115 | 1 | TPP | 22.9 | 0.3 | 52.3 | 29.4 | 1.8 | 57.4 | 34.5 | 1.3 | 59.9 | 36.9 | 1.3 |
| | | 2 | Pα | 22.4 | 0.2 | 51.5 | 29.1 | 0.8 | 59.2 | 36.7 | 0.8 | 63.0 | 40.6 | 0.8 |
| | US TESTING | 1 | TPP | 20.9 | 0.2 | 27.6 | 6.7 | 0.6 | 29.9 | 9.0 | 0.6 | 31.1 | 10.2 | 0.6 |
| | | 2 | Pα | 29.8 | 0.2 | 28.3 | 7.4 | 0.7 | 31.0 | 10.1 | 0.6 | 32.8 | 11.9 | 0.7 |
| Grayish | WF KREFELD | 1 | TPP | 39.5 | 0.3 | 65.5 | 26.0 | 1.5 | 72.2 | 32.7 | 1.8 | 75.2 | 35.7 | 1.7 |
| | | 2 | Pα | 38.8 | 0.3 | 63.8 | 25.0 | 1.8 | 76.4 | 37.6 | 1.6 | 81.4 | 42.6 | 1.1 |
| soils | TEST FABRICS | 1 | TPP | 25.2 | 0.4 | 48.0 | 22.8 | 0.6 | 51.6 | 26.4 | 0.4 | 53.0 | 27.7 | 0.8 |
| | | 2 | Pα | 25.3 | 0.3 | 50.4 | 25.2 | 0.9 | 57.1 | 31.9 | 0.9 | 60.6 | 35.4 | 0.8 |
| | EMPA 101 | 1 | TPP | 15.1 | 0.4 | 29.3 | 14.2 | 2.0 | 31.7 | 16.6 | 2.0 | 32.6 | 17.5 | 1.9 |
| | | 2 | Pα | 15.3 | 0.3 | 29.3 | 14.0 | 2.0 | 34.0 | 18.7 | 2.2 | 35.6 | 20.3 | 2.4 |
| | EMPA 115 | 1 | TPP | 37.2 | 0.2 | 46.1 | 8.9 | 0.3 | 50.1 | 12.9 | 0.1 | 53.7 | 16.5 | 0.2 |
| | | 2 | Pα | 36.9 | 0.4 | 45.7 | 8.8 | 0.3 | 49.0 | 12.1 | 0.3 | 51.3 | 14.4 | 0.3 |
| | Blood, ink, | 1 | TPP | 9.0 | 0.3 | 11.2 | 2.2 | 0.2 | 11.5 | 2.5 | 0.3 | 11.8 | 2.9 | 0.2 |
| | | 2 | Pα | 9.3 | 0.1 | 13.3 | 4.0 | 0.7 | 14.2 | 4.9 | 0.8 | 14.5 | 5.2 | 0.7 |
| Soils | Cocoa | 1 | TPP | 22.6 | 0.6 | 36.1 | 13.5 | 1.4 | 39.5 | 16.9 | 1.4 | 43.2 | 20.6 | 1.5 |
| | | 2 | Pα | 22.5 | 0.7 | 33.8 | 11.3 | 1.6 | 37.2 | 14.6 | 1.6 | 40.8 | 18.2 | 1.4 |
| To be | Wine | 1 | TPP | 35.1 | 1.0 | 70.9 | 35.8 | 0.9 | 80.7 | 45.6 | 0.9 | 85.0 | 49.8 | 0.8 |
| | | 2 | Pα | 35.6 | 0.6 | 71.5 | 35.8 | 0.6 | 79.1 | 43.5 | 0.5 | 84.8 | 49.2 | 0.5 |
| dis- | Tea | 1 | TPP | 26.8 | 0.5 | 54.1 | 27.3 | 0.9 | 67.3 | 40.5 0.8 | 77.2 | 50.4 | 0.6 | |
| | | 2 | Pα | 27.3 | 0.3 | 57.6 | 30.3 | 1.0 | 69.5 | 42.2 | 0.9 | 76.7 | 49.4 | 0.8 |
| coloured | Bilberry | 1 | TPP | 28.2 | 0.6 | 83.1 | 54.9 | 0.7 | 90.1 | 61.9 | 0.6 | 93.7 | 65.4 | 0.3 |
| | | 2 | Pα | 28.5 | 0.4 | 83.3 | 54.7 | 0.6 | 89.9 | 61.3 | 0.4 | 93.3 | 64.7 | 0.3 |
| | Black-currant | 1 | TPP | 35.9 | 0.3 | 79.6 | 43.7 | 0.7 | 88.4 | 52.5 | 0.4 | 92.0 | 56.1 | 0.4 |
| | | 2 | Pα | 36.9 | 0.3 | 81.9 | 45.0 | 0.5 | 89.4 | 52.5 | 0.4 | 93.2 | 56.3 | 0.4 |
| white | CENATRA | 1 | TPP | 86.4 | 0.4 | 97.5 | 11.1 | 0.4 | 97.1 | 10.7 | 0.9 | 98.1 | 11.7 | 0.5 |
| | | 2 | Pα | 87.3 | 0.6 | 97.5 | 10.1 | 0.7 | 98.1 | 11.4 | 0.6 | 99.7 | 12.3 | 0.7 |
| cottons | TEST FABRICS | 1 | TPP | 86.9 | 0.3 | 97.2 | 10.4 | 0.4 | 97.3 | 10.4 | 0.3 | 98.3 | 11.4 | 0.3 |
| | | 2 | Pα | 87.1 | 0.5 | 97.6 | 10.4 | 0.6 | 98.9 | 11.7 | 0.5 | 99.4 | 12.2 | 0.4 |

We may conclude that there is a practical equivalence of the poly-α-hydroxyacrylate according to the invention and sodium tripolyphosphate with regard to the bleaching properties.

EXAMPLE 5

The salts of poly-α-hydroxyacrylic acids according to the invention are characterized by a good behaviour with regard to corrosion of metals. In order to evaluate this behaviour, a solution of washing powder (the composition of which is given hereafter) containing a certain amount of metal dust, was kept boiling for 15 minutes; after that the solution was filtered and the quantity of metal ions in the solution determined. The tests carried out by way of comparison have been executed with sodium tripolyphosphate (TPP), sodium nitrilotriacetate (NTA) and sodium poly-α-hydroxyacrylate prepared according to the example 1 ($P_\alpha$).

Two series of tests have been executed using two types of working conditions:

|  |  | Series 1 | Series 2 |
|---|---|---|---|
| Powder used | g/l | 5 | 14 |
| Sequesting agent content of the powder | % | 35 | 50 |
| Perborate content of the powder | % | 25 | 35.7 |
| Silicate content of the powder | % | 6 | 2.2 |

The conditions of the first series are normal, whereas those of the second one have been selected in order to increase the severity of the test.

The other conditions, identical for two series, are the following

|  |  |  |
|---|---|---|
| water, hardness | °HF | 35 |
| metal in powder used | g/l | 0.5 |

The composition of the powders used is the following, g/100 g:

| Components | Series 1 | Series 2 |
|---|---|---|
| TPP, NTA or $P_\alpha$ | 35 | 50 |
| Sodium perborate tetrahydrate | 25 | 35.7 |
| Sodium metasilicate, anhydrous | 6 | 2.2 |
| Sodium carbonate, anhydrous | 3 | 1.1 |
| Alkylarsulfonate | 13 | 4.7 |
| Condensate of ethylene oxide/nonylphenol | 5 | 1.63 |
| Coco monoethanolamide | 2 | 0.7 |
| Carboxymethylcellulose | 0.5 | 0.2 |
| Sodium ethylenediaminetetraacetate | 0.2 | 0.07 |
| Sodium sulfate | 1.2 | 0.45 |
| Water | 9.1 | 3.25 |
|  | 100 | 100 |

The results obtained are given in the following Table 6.

TABLE 6

| Metal used | Metal dissolved, % | | | | | |
|---|---|---|---|---|---|---|
| | Series 1 | | | Series 2 | | |
| | sequestering agent present in the powder | | | | | |
| | TPP | NTA | $P_\alpha$ | TPP | NTA | $P_\alpha$ |
| Copper | 3 | 28 | 17 | 5 | 80 | 21 |
| Zinc | 12 | 43 | 8 | 39 | 99 | 10 |
| Nickel | 0.5 | 1.4 | 0.2 | 1 | 4 | 0.4 |

Note: The metal traces brought in by water and the washing product have been taken into consideration.

In short, the sodium poly-α-hydroxyacrylate gives on zinc and nickel better results than the sodium tripolyphosphate and especially than the sodium nitrilotriacetate. Concerning copper, the sodium poly-α-hydroxyacrylate is more aggressive than sodium tripolyphosphate, but distinctly less aggressive than sodium nitrilotriacetate.

The sodium poly-α-hydroxyacrylate used in the above examples has been obtained from an acrylic compound. The preparation method can be easily adapted to obtain poly-α-hydroxyalkylacrylates, more particularly water-soluble salts of a poly-α-hydroxymethacrylic acid. Ammonium salts are obtained by operating in the same way by replacing sodium hydroxide by ammonium hydroxide in order to neutralize poly-α-hydroxyacrylic acid.

As has already been said, the value of n in the formula

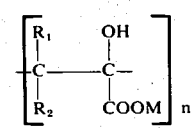

must be a positive integer comprised between 3 and a higher value such that a substantial solubility in water is maintained. When applied to the sodium salt of poly-α-hydroxyacrylic acid, this latter higher value corresponds to a concentration of about 0.0375 g of dissolved polyelectrolyte per litre of water, which is the minimum concentration to obtain a sequestering activity. This means that in a very hard water, e.g. 50° HF, the mol-concentration of the recurring mers

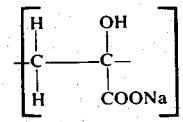

is about 0.0682 per mol of calcium ions which determine the hardness of the water.

When applied to other alkali metal salts or ammonium salts, and also to alkyl derivatives of poly-α-hydroxyacrylates as described herein, the mol-concentration of the polyelectrolyte that must be dissolved in the water to obtain a substantial solubility may be calculated on the same basis (0.0375 g/l) by taking into account the molecular weight of the recurring mers in the polyelectrolyte.

In the preceding examples, the polyelectrolyte according to the invention has been used in detergent compositions containing surfactants. It remains of course in the range of the present invention to use the described polyelectrolytes in detergent compositions which do not contain surfactants; such compositions are well known, as mentioned in KIRK-OTHMER, Encyclopedia of Chemical Technology — 2nd Ed. — Vol. 6 — p. 853–895.

It will be understood that the above description of the present invention is susceptible to various modifications, changes and adaptations, and the same are intended to be comprehended within the meaning and range of equivalents of the appended claims.

I claim:

1. A detergent composition comprising at least a surface active agent and at least, as builder, a polyelectrolyte with sequestering action toward metal ions, said polyelectrolyte having the formula

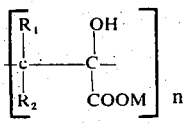

where $R_1$ and $R_2$ are selected from the group consisting of hydrogen and alkyl of between 1 and 3 carbon atoms, M is selected from the group consisting of alkali metal and ammonium, and $n$ is a positive integer between 3 and a higher value such that substantial solubility of said polyelectrolyte in aqueous solution is maintained when said detergent composition is added to water.

2. A detergent composition comprising, at least, as builder, a polyelectrolyte with sequestering action towards metal ions, said polyelectrolyte having the formula

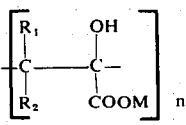

where $R_1$ and $R_2$ are selected from the group consisting of hydrogen and alkyl of between 1 and 3 carbon atoms, M is selected from the group consisting of alkali metal and ammonium, and n is a positive integer between 3 and a higher value such that substantial solubility of said polyelectrolyte in aqueous solution is maintained when said detergent composition is added to water.

3. The detergent composition of claim 1 wherein $R_1$ and $R_2$ are hydrogen.

4. The detergent composition of claim 1 wherein $R_1$ and $R_2$ are methyl and hydrogen.

5. The detergent composition of claim 1 wherein the FLORY molecular weight of the polyelectrolyte is at least 20,000.

6. The detergent composition of claim 1 wherein the FLORY molecular weight is at least 26,000.

7. The detergent composition of claim 1 wherein $R_1$ and $R_2$ are hydrogen, M is sodium, and n is 890.

8. The detergent composition of claim 1 wherein $R_1$ and $R_2$ are independently selected from the group consisting of hydrogen and methyl.

9. The detergent composition of claim 1 wherein M is sodium.

10. The detergent composition of claim 1 wherein the polyelectrolyte is a sodium salt of a poly-$\alpha$-hydroxyacrylic acid of the formula

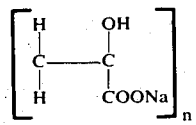

where $n$ is a positive integer between 3 and a higher value such that at least 0.0375g/l of the polyelectrolyte is dissolved in water when the detergent is added to water.

* * * * *